Figure 4:
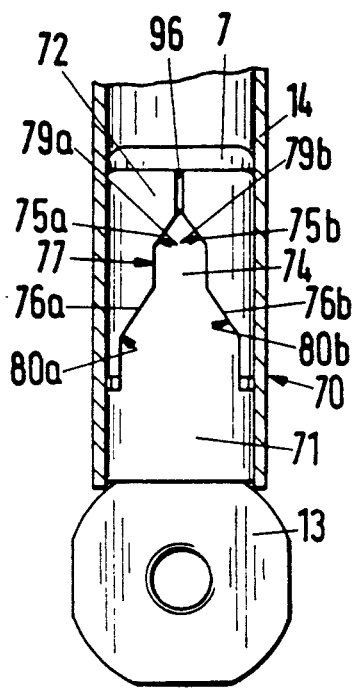

United States Patent [19]

Scherrer

[11] Patent Number: 5,238,343
[45] Date of Patent: Aug. 24, 1993

[54] CONNECTING ELEMENT

[75] Inventor: Kurt Scherrer, Muensingen, Switzerland

[73] Assignee: USM U. Schärer Söhne A.G., Münsingen, Switzerland

[21] Appl. No.: 893,886

[22] Filed: Jun. 4, 1992

Related U.S. Application Data

[63] Continuation of Ser. No. 524,550, May 17, 1990, abandoned.

[30] Foreign Application Priority Data

May 30, 1989 [CH] Switzerland .............. 2/022/89-0

[51] Int. Cl.⁵ .............................................. F16B 13/06
[52] U.S. Cl. ........................................ 411/55; 411/32; 411/61; 403/371; 403/297
[58] Field of Search ................. 411/61, 63, 64, 65, 411/58, 42, 75, 24, 25, 354, 55, 32; 403/371, 370, 368, 367, 297

[56]  References Cited

U.S. PATENT DOCUMENTS

| | | | |
|---|---|---|---|
| 694,345 | 3/1902 | Bennett | 411/65 |
| 1,291,119 | 1/1919 | Pleister | 411/65 |
| 1,429,298 | 9/1922 | Pleister . | |
| 1,922,099 | 8/1933 | Kilian | 411/24 X |
| 2,028,328 | 1/1936 | Herold | 411/45 X |
| 2,293,491 | 8/1942 | Cox | 411/61 |
| 2,643,143 | 6/1953 | Bergqvist . | |
| 2,988,950 | 6/1961 | Dempsey | 411/65 |
| 3,815,198 | 6/1974 | Thalenfeld . | |
| 3,945,743 | 3/1976 | Koch . | |
| 4,195,952 | 4/1980 | Swanson | 411/61 X |
| 4,481,702 | 11/1984 | Mitchell | 411/58 X |
| 4,609,316 | 9/1986 | Oettl | 411/61 X |
| 4,673,321 | 6/1987 | Herb et al. | 411/61 X |
| 4,861,198 | 8/1989 | Stankus | 411/65 X |
| 4,883,396 | 11/1989 | Shamah et al. | 411/65 X |

FOREIGN PATENT DOCUMENTS

| | | |
|---|---|---|
| 3237468 | 4/1984 | Fed. Rep. of Germany . |
| 3426288 | 1/1986 | Fed. Rep. of Germany . |
| 3528744 | 2/1987 | Fed. Rep. of Germany . |
| 3523155 | 4/1988 | Fed. Rep. of Germany . |
| 2278978 | 2/1976 | France . |
| 429317 | 1/1967 | Switzerland . |
| 488120 | 3/1970 | Switzerland . |
| 11612 | 8/1914 | United Kingdom . |
| 1475839 | 6/1977 | United Kingdom . |

Primary Examiner—Peter M. Cuomo
Assistant Examiner—Jerry Redman
Attorney, Agent, or Firm—Brady, O'Boyle & Gates

[57]  ABSTRACT

A connecting element for joining a structural part with an adjacent structural part has several sleeves (71, 72) provided with respectively one cutout (77) and one extension (74) wherein in each case the extension (74) of one sleeve (71, 72) engages into the cutout (77) of the other sleeve (71, 72). The sleeves (71, 72) are in contact with fitting clearance with an inner wall of a pipe (14) to be attached to a connector (13). A clamping screw (7) is threaded into a thread (9) of the connector (13) and thereby clamps the sleeves (71, 72) mutually in place, the extensions (74, 87) entering more deeply into the cutouts (77, 92) and thereby expanding the circumference of the sleeves (71, 72) until a fixed clamping of the sleeves (71, 72) against the inner wall is achieved. The sleeves (71, 72) are held in flush mutual contact by a serration. The unwound of the sleeves (71, 72) are punched out from steel strip and subsequently formed into cylindrical sleeves (71, 72). The connecting element (70) can be utilized in particular for producing shelves, sales booths, racks, and similar pipe constructions, as well as in the form of so-called expanding dowels wherein the undetachable interconnection of the sleeves (71, 72) with each other and with the clamping screw (7) permits a rapid and simply to be accomplished assembly.

10 Claims, 2 Drawing Sheets

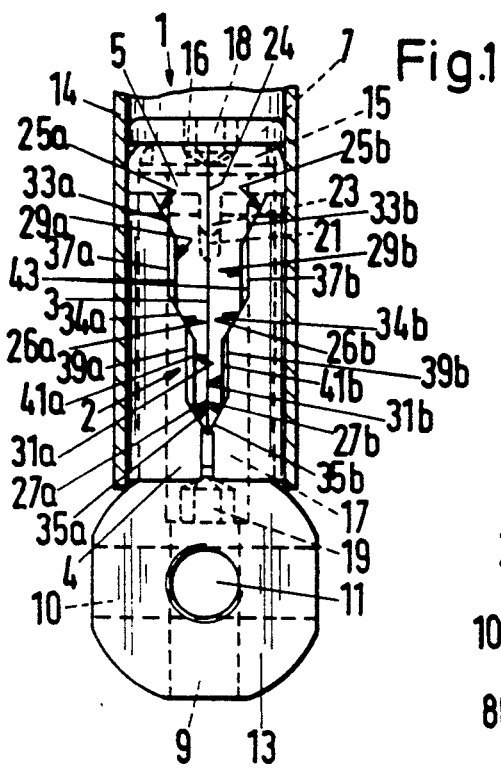
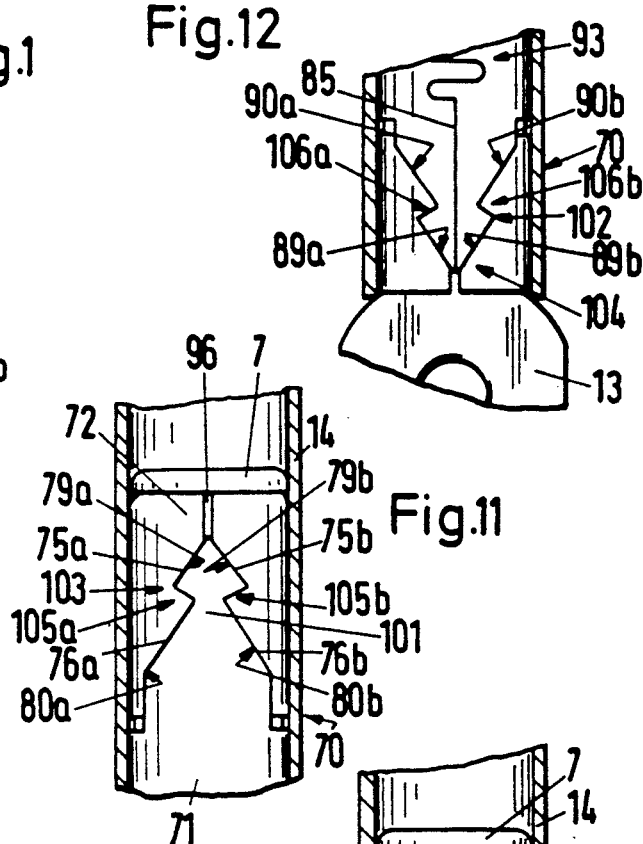
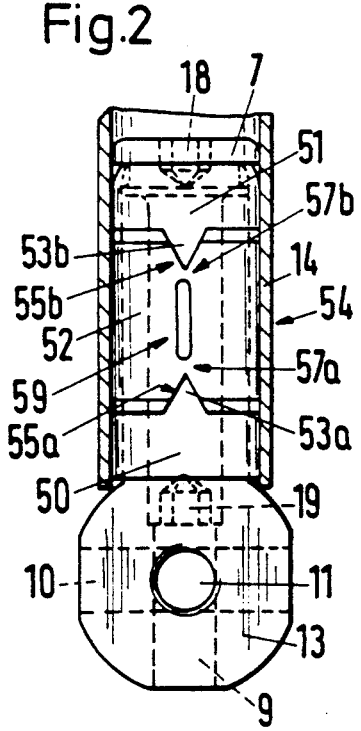
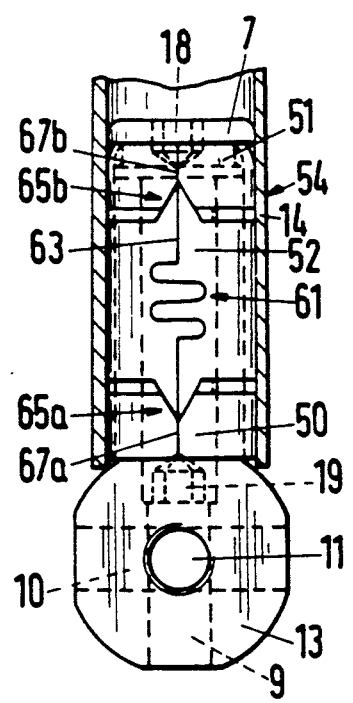
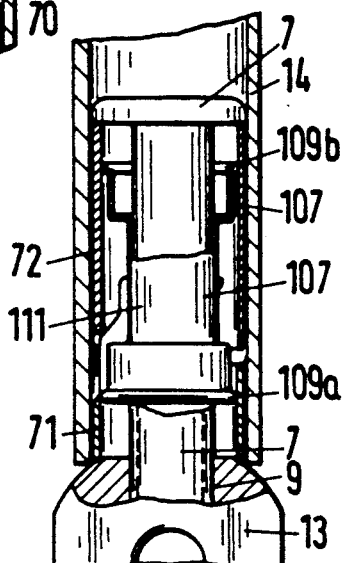

a) b) c) d) e) f) g) h)

CONNECTING ELEMENT

This application is a continuation of application Ser. No. 07/524,550 filed on May 17, 1990.

The invention relates to an element, fixedly clampable in a hole of a structural part, for connecting an adjoining structural part, and to a process for producing the connecting element.

A connecting element of this type has been described in Swiss Patent 429,317 and is utilized in trestle construction for the production of pipe connections. This element consists of two identical splined sleeves in mutual contact with each other with their inclined sliding surfaces within a pipe end to be attached to a connecting member. By means of a clamp bolt to be threaded into a thread of the connecting member and extending through the sleeves, the two splined sleeves are mutually tightened while sliding along the sliding surfaces, since the sleeves contact, on the end face pointing away from the sliding surface, the connecting member and, respectively, the bolt head, and thereby they are pressed against the inner surface of the pipe end whereby the pipe end is joined to the connecting member.

A connecting element disclosed in German Patent 3,523,155 differs from the aforementioned type by a single sleeve fashioned as an expansion sleeve which is widened by an expansion cone which latter can be drawn into the sleeve by means of a clamp bolt. Here again, the clamp bolt is threaded into a connecting member, the expansion sleeve being in contact with this member with its end face. By the expansion action, this expansion sleeve is pressed against the inner surface of a pipe end to be attached to the connecting member.

An analogous connecting element is described in DOS 3,528,744 for use as a wall dowel. As contrasted to German Patent 3,523,155, the wall thickness in this reference is designed to be thinner, and a second expansion slot is provided, with an intentional breaking zone as well as two diametrically opposed lugs which bite into the drill hole wall.

The production of the connecting elements known from Swiss Patent 429,317 and German Patent 3,523,155 is complicated and therefore expensive. In order to obtain ready slidability of the two splined sleeves along their inclined sliding surfaces, the latter had to be machined after cutting in a further working step.

In a fixation element for telescopically extensible pipes described in U.S. Pat. No. 2,643,143 and not of the type under consideration, one pipe end has a wedge-like extension which is inserted in a V-shaped, continuous cutout of a sleeve flush with the pipe end which sleeve, in the unstressed condition, has the same outer diameter as the pipe. The sleeve is pinned with a clamp bolt pulled into the interior of the pipe by means of a compression spring. The clamp bolt can be moved axially by means of a lever against the bias of the compression spring. If the compression spring is relaxed, the pipe end can be shifted to and fro in a second pipe. If the compression spring is operative, the sleeve is pulled with its V-shaped cutout onto the extension and thus spread apart whereby it is urged against the tubular inner wall of the second pipe. Thereby, displacement of the two pipes with respect to each other is to be prevented.

The fixation element described in U.S. Pat. No. 2,643,143 requires complicated mechanical work on one of the pipes and is suitable only for connecting two pipes.

Additional connecting devices are known from U.S. Pat. No. 3,945,743; French Patent A 2,278,978; Swiss Patent 488,120; and U.S. Pat. No. 3,815,198.

The invention is to provide a remedy in this connection. The invention as characterized herein solves the problem of creating a connecting element that can be manufactured in a simple and economical way and permits rapid assembly.

The invention solves the problem of fashioning the connecting element so that it can be pressed with little expenditure of force against the inner side of the hole or of the pipe by means of a clamping screw whereby a uniform contact pressure of the sleeves against the inner surface is made possible without marked deformation thereof.

The process for manufacturing the connecting element is also the subject matter of this invention.

Special embodiments of the invention are indicated, and additional problems solved thereby, and advantages attainable thereby, can be derived from the following explanations of the invention.

Figure 5:
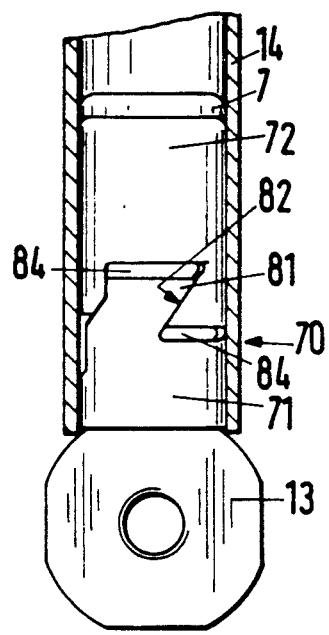
Figure 6:
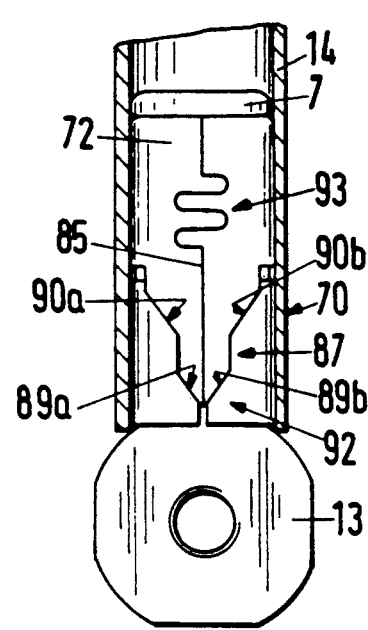
Figure 7:
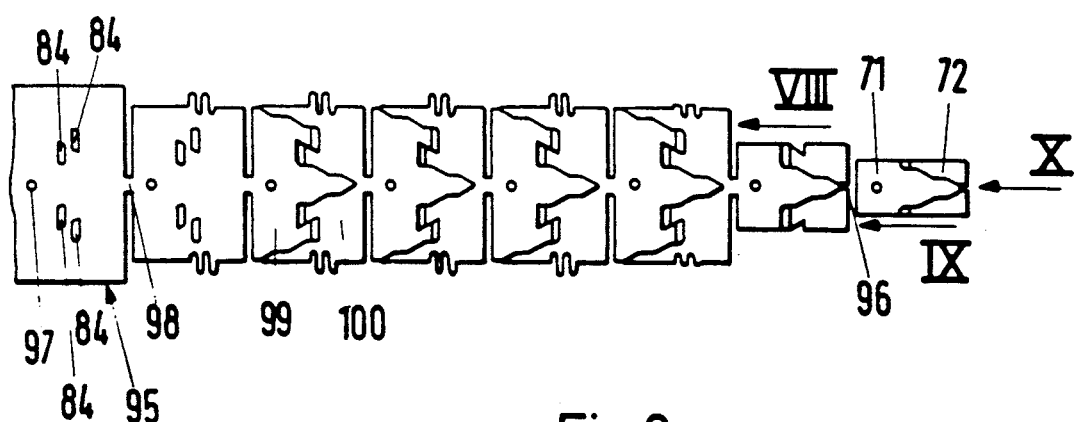
Figure 8:
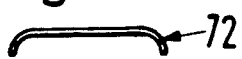
Figure 9:
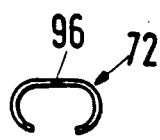
Figure 10:
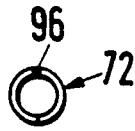

Embodiments of the connecting element according to this invention will be described in greater detail below with reference to the drawings wherein:

FIG. 1 shows a lateral view of a connecting element with two sleeves, attached to a connecting member and fixedly clamped in a pipe, the pipe being shown in a sectional view in order to provide a clearer illustration of the sleeves, FIG. 2 shows a diametrically opposed lateral view of a modification of the connecting element, FIG. 3 shows a rear view of the connecting element shown in FIG. 2, FIG. 4 is a lateral view of another version of the connecting element, FIG. 5 is a lateral view of the version of FIG. 4, rotated by 90°, and FIG. 6 is a lateral view of the version of FIG. 4, rotated by 180°, FIG. 7 is a top view of a punched and partially bent end piece of a sheet metal strip, FIG. 8 is a top view of the end face of a sleeve after a first bending step in the viewing direction VIII in FIG. 7, the elements of stations (g) and (h) having been removed, FIG. 9 is a top view of the end face of a sleeve after a second bending step, following the first step, in the viewing direction IX in FIG. 7, the completely bent sleeves in station (h) having been removed, FIG. 10 is a top view of the end face of a sleeve after termination of the bending steps, in the viewing direction X in FIG. 7, FIG. 11 is a lateral view of a version with a serrated, wedge-shaped extension and associated V-shaped cutout of neighboring sleeves, FIG. 12 shows a diametrically opposite lateral view of the sleeves shown in FIG. 11, and FIG. 13 illustrates a partial section through a version of the connecting element wherein the clamping screw is undetachably held in the thread-in position by means of a clamping sleeve.

The connecting element 1 shown in FIG. 1 comprises respectively one cylindrical sleeve 4 and 5 provided with a V-shaped cutout 2 and with a wedge-shaped extension 3, as well as a clamping screw 7 serving as the clamping element and threaded into a continuous thread 9 of, in total, three identical diagonal continuous threads 9, 10, and 11 of a structural part designed as a spherical connector 13. The connecting element 1 connects a pipe 14, as an additional building component, with the adjoining connector 13. In order to provide a clearer illustration of the sleeves 4 and 5, the pipe 14 held by the sleeve 4 is shown in sectional view.

The clamping screw 7 has a narrow coaxial shoulder 15 as the holding means at the screw head, this shoulder passing over with a bead 16 into the screw shank 17. The sleeve 5 is bent around the bead 16 at its upper end in such a way that it can be turned around the shoulder 15 with a fitting clearance, but cannot, be pulled off without expenditure of force. Thereby, the clamping screw 7 is undetachably connected with the sleeve 5. The thread of the clamping screw 7 fits with the threads 9, 10, and 11. Respectively one hexagon socket 18 and 19 is provided in the screw head as well as in the screw end. The coaxial shoulder 15 and the bead 16 are produced, for example, by turning the screw head of the clamp bolt 7.

The sleeve 4 has a groove 21 on its rear side in opposition to the cutout 2, as shown in dashed lines in FIG. 1; a tongue 23 of the sleeve 5 engages into this groove as an axial guidance for both sleeves 4 and 5.

The extension 3 as well as the entire sleeve 5 are cut through by a slot 24 required by manufacturing conditions, as will be explained below, using a version of the connecting element 70, shows in FIG. 6, as example. The extension 3 has three pairs of wedge surfaces 25a, 25b, 26a, 26b, 27a, and 27b, the areas a and b of each of the surface pairs 25a,b , 26a,b and 27a,b being inclined in mirror-image relationship under the same angle with respect to the extension axis. The surface pairs 25a,b and 26a,b are separated by an edge pair 29a,b, the edges of which extend along outer surface lines of the sleeve 4 and 5, respectively, and the surface pairs 26a,b and 27a,b are separated by another edge pair 31a,b, the edges of which extend along outer surface lines of the sleeve 4 and 5, respectively. The pair of surfaces 27a and b converges at an acute angle.

The cutout 2 is designed analogously to the extension 3, i.e. it exhibits, as compared with the wedge surface pairs 25a, 26a,b, and 27a,b likewise three wedge surface pairs 33a,b, 34a,b, and 35a,b with the same wedge angle, separated from one another analogously to the edge pairs 29a/b and 31a/b by edge pairs 37a/b and 39a/b.

The edge pairs 29a,b and 37a,b, as well as 31a,b and 39a,b are separated from each other by means of interspaces 41a and 41b and 43, respectively, in correspondence with a clearance fitting. The wedge surfaces 25a/33a, 25b/33b, 26a/34a, 26b/34b, 27a/35a, and 27b/35b are joined by way of an intentional breaking zone stemming from a punching step analogous to the punching step of the connecting element 70. On account of this intentional breaking zone, the two sleeves 4 and 5 are undetachably joined, i.e. also with the clamping screw 7. Only when the clamping screw 7 is tightened will the intentional breaking zones rupture. The greater the force with which the extension 3 is urged by the clamping screw 7 into the cutout 2, the larger become the interspaces 41a and 41b and 43, respectively, and the more forcibly is the expansion sleeve 4 pressed against the inner wall of the pipe 14. In the uncompressed condition, the diameter of the sleeve 4 is just of such a size that this sleeve, together with the sleeve 5, can be inserted with large fitting clearance in the pipe 14.

The sleeves 4 and 5 consist of a flat material; the form, as described below, is punched out of sheet metal and is then bent into the sleeve shape. The wedge angles of the wedge surface pairs 33, 34, and 35, as well as of the edge pairs 37a,b, and 39a,b are chosen to be so large that no self-locking action occurs so that, after loosening of the clamp bolt 7, the extension 3 automatically slides out of the cutout 2. Thereby the clamping action of the sleeves 4 and 5 with the inner surface of the pipe is eliminated and the connecting element 1, after the clamping screw 7 has been completely removed by threading out of the connecting member 13, can be pulled from the pipe end.

In place of the above-described three wedge surface pairs 25a,b, 26a,b, and 27a,b, as well as 33a,b, 34a,b, and 35a,b, it is possible to work with only one wedge surface pair per extension and cutout, if the contact force is not excessively high; however, in such case problems can be encountered during the manufacturing process when the sleeves are bent since the intentional breaking zones may already rupture during the bending step and thus the sleeves can slide apart along their wedge surfaces whereby likewise the undetachable characteristic of the individual connecting element parts would no longer be present.

Instead of the two sleeves 4 and 5, it is possible to use three sleeves 50, 51, and 52 in a connecting element 54; a lateral view, analogously to FIG. 1, is shown in FIG. 2, and a rear view is illustrated in FIG. 3.

The sleeves 50 and 51, as shown in FIG. 2, each have an extension 53a and 53b engaging into respectively one cutout 55a and 55b of the sleeve 52. Two additional extensions 65a and 65b are disposed in opposition on each of the sleeve end faces of the sleeve 52. The extensions 65a and 65b engage into respectively one cutout 67a and 67b of the sleeves 50 and 51, as illustrated in FIG. 3. The extensions 53a and 53b, in the unassembled condition, are still connected from the manufacturing process with the cutouts 55a and 55b by intentional breaking zones, analogously to the connecting element 1. Also, the two cutouts 55a and 55b are, in the unmounted condition, separated from a longitudinal slot 59 by respectively one web 57a and 57b. After assembly in the pipe 14, the webs 57a and 57b break as intentional breaking zones upon tightening of the clamping screw 7, and the two cutouts 55a and 55b are joined by way of the longitudinal slot 59; the sleeve 52 is broken open.

In FIG. 3, a serration 61 of the sleeve 52 can be seen, with respectively two projections pressed into respectively two indentations of the opposite side. After breaking the webs 57a and b, the two halves of the sleeve 52 are held together by this serration 61 in such a way that the two halves can be pressed against the inner surface of the pipe 14 but do not fall apart. The parting line 63 of the serration 61 likewise separates each of the extensions 65a and 65b of the sleeve 52.

With the connecting element 54 mounted in the tube 14, the three sleeves 50, 51, and 52 are urged against one another by tightening the clamping screw 7 after breaking of the intentional breaking zones. Thereby the extension 53a advances into the cutout 55a, and the extension 53b into the cutout 55b whereby the longitudinal slot 59 of the sleeve 52 is urged apart, and the halves of the sleeve 52 are pressed against the inner surface of the tube 14. Analogously, the extensions 65a and 65b spread the cutouts 67a and 67b of the sleeves 50 and 51 apart whereby the sleeves 50 and 51 are likewise urged against the inner surface of the pipe 14. The four extensions 53a and b as well as 65a and b effect a uniform contact pressure of the sleeves 51 and 52 against the inner surface of the pipe 14, the three sleeves 50, 51, and 52 being in flush upright contact.

Another version of a connecting element 70 with two sleeves 71 and 72 is illustrated in FIGS. 4, 5, and 6. FIG. 4 shows the two sleeves 71 and 72 analogously to the illustration of the two sleeves 4 and 5 in FIG. 1. As contrasted to the sleeve 4, the sleeve 71 has at its extension 74 only two wedge surface pairs 75a/b and 76a/b, and the sleeve 72 has at its cutout 77 only two edge pairs 79a/b and 80a/b. The sleeve 72 is likewise bent at its upper end about the bead 16 of the clamping screw 7 in such a way that it can be turned around the shoulder 15 with a fitting clearance, but cannot be pulled off. The wedge-shaped extension and the V-shaped cutout at each sleeve are arranged so that they oppose each other diametrically.

FIG. 5 shows the connecting element 70 in a position rotated by 90° with respect to FIG. 4. The pipe 14 is shown in sectional view in the illustrations of FIGS. 4–6 in order to illustrate more clearly the sleeves 71 and 72. The sleeve 71 has two extensions 81 (one extension 81 can be seen in FIG. 5), each engaging into a recess 82 (one recess 82 is shown in FIG. 5) of the sleeve 72. The extensions 81 and the recesses 82 are arranged approximately symmetrically to the extension 74 and, respectively, the cutout 77, but this is not absolutely necessary for their mode of operation described below. Respectively one gap 84 is located between the end of extension 81 and the bottom of the recess 82. The extension 81 flares toward its end, and the recess 82 flares towards its bottom. Thereby, the extension 81 and the recess 82 are in undetachably meshing connection with each other; but they can be moved toward each other by the width of the gap 84. This width is selected to be of such a size that it is larger by one tolerance than the maximum axial displacement of the sleeves 71 and 72 in the step of coming into pressure contact with the inner surface of the pipe 14, described below.

FIG. 6 shows the connecting element 70 in a position rotated by 180° with respect to FIG. 4. A longitudinal slot 85 divides an extension 87 of the sleeve 72, the wedge surface pairs 89a/b and 90a/b of which are designed with the same length and the same wedge angle as the wedge surface pairs 75 and 76. The edge pairs in the cutout 92 are analogously designed. The longitudinal slot 85, as described above in connection with sleeve 52, passes over into a serration 93 with respectively two projections and indentations, the function of which is the same as in case of sleeve 52.

Upon tightening of the clamp bolt 7, the extension 74 expands the sleeve 72, and the extension 87 spreads the sleeve 71 apart, whereby both sleeves 71 and 72 are urged uniformly against the inner surface of pipe 14.

The production of the connecting elements, will be explained with reference to the connecting element 70 in FIG. 7, from a strip of steel sheet 95 unwound from a reel, not illustrated. Lateral guide elements for the sheet metal strip 95 are not shown. The individual processing stations are denoted by the letters (a) through (e) in FIG. 7. Station (f) shows the bent sleeves 71 and 72 as illustrated with a view toward the end side of sleeve 72 in FIG. 8. Station (g) shows a further bending step wherein the view is shown on the end face of the sleeve 72 in FIG. 9; the cutout 77 was cut open by severing a web 96. In station (h), the sleeves 71 and 72 are completely bent and firmly meshed by means of the serration 93. The sleeve 72 is shown in FIG. 10 with a view toward its end face.

In processing station (a), the four gaps 84 and a conveying hole 97 (several holes can also be used) are punched into the sheet metal strip 95; a pin, not illustrated, engagees into the conveying hole for transporting the sheet metal strip from one station to the next.

In station (b), the rims of the unwound profiles 99 and 100 for the sleeves 71 and 72 are punched out so that the indentations and projections of the serration 93 and a web 98 toward the sheet metal piece of station (a) remain; thereby, the end edge of one of the sleeves 72 [station (a)], as well as the end edge of one of the sleeves 71 [station (b)]are punched out.

In station (c), the unwound blanks 99 and 100 of the two sleeves 71 and 72 are punched so that their parting line is weakened as an intentional breaking zone, but both blanks are still coherent.

Nothing is done in station (d), and in station (e), the shaped piece 100, urged out of the sheet metal plane by the punching step in station (c), is again pressed back into the sheet metal plane (aligning station); both shaped pieces still hang together. Station (d) is required to locally separate the punching step of station (c) from the aligning station (e).

A first bending step is performed in station (f) wherein the two shaped pieces 99 and 100 are bent into the configuration shown in FIG. 8 with a view toward the end faces. A second bending step takes place in station (g) to obtain the shape shown in FIG. 9 wherein, after bending, the web 96 is severed as indicated above.

In station (h), the shaped pieces 99 and 100 are bent into the sleeves 71 and 72 and cut off from the sheet metal strip 97. During the complete bending into a round shape, the depressions and projections of the serration 93, forming a press-fit, are firmly pressed into each other.

By the progression of this treatment procedure, both sleeves 71 and 72 are manufactured together. Only after the first tightening of the clamping screw 7 in the pipe 14 will the parting line between both sleeves 71 and 72 be completely broken open. Both sleeves 71 and 72 are undetachably joined by meshing via the two extensions 81 and recesses 82, but they are axially movable in such a way that the sleeves can be inserted one in the other to such an extent that they can be firmly pressed against the inner surface of the pipe 14. Since both sleeves 71 and 72 are mechanically joined during the bending step by way of the parting line, they cannot be driven apart by their extensions 74 and 87 out of the cutouts 77 and 92 the parting lines of which have not as yet been broken through.

Instead of making the sleeves 3, 4, 50, 51, 52, 71, and 72 of steel strip, it is also possible to use other elastic materials. If the connecting element 1 is to be utilized only a single time, then nonelastic materials can likewise be employed.

Also the sleeves 4 and 5, as well as the sleeves 50 and 52, and the sleeves 51 and 52, can be clamped together analogously to the sleeves 71 and 72 with extensions (analogously to 81) and fitting recesses (analogously to 82), in order to retain the sleeves undetachably in flush alignment. It is also possible to establish meshing engagement of the wedge-shaped extension of extensions of one sleeve with the associated V-shaped cutout or cutouts by means of a serration 105a/b and 106a/b, as illustrated in FIGS. 11 and 12 with the aid of respectively one wedge-shaped extension 101 and 102, modified with respect to the wedge-shaped extensions 74 and 87 as well as the V-shaped cutouts 77 and 92 of the sleeves 71 and 72, as well as with the aid of respectively one modified V-shaped cutout 103 and 104. These serrations 105a/b and 106a/b act analogously to an intentional breaking zone as described above, between the rims of the cutout 103 and the extension 101 as well as the cutout 104 and the extension 102. The intentional breaking zone and the serration serve the same task of holding the sleeves together in an undetachable fashion and avoiding, during the bending step, a sliding apart of the sleeves along their wedge surfaces. One advantage of the serration 105a/b and 106a/b as compared with the intentional breaking zone resides in an improved force transmission possibility over the parting line as well as in identical properties even with repeated utilization of the connecting element 70. The serration is not absolutely required for the undetachable connection of the sleeves since this property is already ensured by the extensions 81 and 82.

Instead of providing a bead 16 at the head of the clamp bolt and bending the neighboring sleeve rim therearound, it is also possible to use a clamping element between the bolt thread and the inner surface of one of the sleeves 4, 5, 50, 51, 71, or 72. The clamping element can be, for example, a perforated plate with a U-shaped cross section elastically braced between the bolt thread and the inner sleeve surface wherein one leg presses against the bolt thread and the other leg presses against the inner wall of one of the sleeves 4, 5, 50, 51, 52, 71, or 72. Advantageously, the clamping screw 7 is centrally unattachably retained in one or both of the sleeves so that threading of the screw thread into the connector 13 during assembly of the pipe 14 at the connector 13 can be easily performed.

Instead of holding the clamping screw 7 in an undetachable fashion by means of resilient perforated disks or a bent rim of the sleeve adjacent to the screw head, it is also possible to employ a clamping sleeve 107, illustrated in a partially sectional view in FIG. 13. At each sleeve end, the clamping sleeve 107 has respectively one clamping ring 109a and 109b pressing against the sleeve 71 and sleeve 72, respectively. The clamping sleeve 107 is seated with a slight press fit in its narrowed portion 111 on the shank of the clamping screw 7. The clamping sleeve 107, on the one hand, retains the clamping screw 7 undetachably in the two sleeves 71 and 72, as mentioned above and, on the other hand, the sleeve 107 retains the screw thread in the threading position for the easy threading into one of the threads of the connector 13.

By the joint clamping connection of neighboring sleeves and by retaining the clamping screw 7 in one of the sleeves 4, 5, 50, 51, 52, 71, or 72, all parts of the connecting element 1, 54 or 70 are joined undetachably in the correct assembly position and can be inserted in the pipe end as a single component. This shortens the assembly time for the connecting element of this invention substantially as compared with the conventional connecting elements.

The connecting elements 1, 54 and 70 of this invention are readily releasable, i.e. the connection can be repeatedly released and reused for connecting other pipes 14 to connectors 13.

Based on the manufacturing process of this invention, the sleeves 4 and 5, as well as 50, 51, and 52 and, respectively, 71 and 72 can be produced in an extremely economical way from a sheet metal strip 95. The punching step results in such a good surface of the wedge and rim areas that their remachining for improving their mutual slidability is no longer necessary. Also, the structure and the production procedure follow such a concept that all of the sleeves 4, 5, 50, 51, 52, 71, and 72 of the connecting element 1, 54 or 70 can be manufactured simultaneously together and already in clamped connection. Since also the clamping screw 7 is additionally held undetachably in the assembly position in one of the sleeves 4, 5, 50, 51, 52, 71 or 72, the connecting element 1, 54 or 70 of this invention is suitable for the rapid establishment of pipe connections without any problems.

The surprisingly satisfactory clamping action of the sleeve 4 within the pipe 14, and the low clamping force of the clamping screw 7 stem from the fact that the extension 3 drives the cutout 2 apart by means of wedge surface pairs 25, 26, and 27 distributed over its entire length. Thereby, the cylindrical sleeve 4 is expanded uniformly over its entire length and accordingly is in contact with the inner pipe wall with its entire peripheral area. The result is a large, uniform frictional adherence. Analogous remarks apply regarding the extensions 74 and 87 of sleeves 71 and 72, as well as the wedge surfaces 53a, 53b as well as 65a, 65b where, in the latter embodiment, several extensions are provided in place of several wedge surface pairs at one extension.

The low clamping force of the clamping screw 7 to be expended is due to the fact that only an elastical bending force of the thin-walled sleeves 4 and 5 or 50, 51, and 52, as well as 71 and 72 has to be overcome. The main portion of the clamping force is utilized for pressing the sleeves against the inner wall.

The connecting element is utilized with preference in the manufacture of shelves, sales booths, racks, and similar pipe constructions. However, the connecting element can also be used as a so-called expansion dowel for the mounting of doors, for example, in a drill hole of a door frame.

I claim:

1. Connecting means for fixedly connecting a tubular pipe with an adjoining structural part, said tubular pipe having an open end and an interior bore, said structural part having a surface adjacent said open end of said tubular pipe, said connecting means comprising, a single piece of planar sheet metal having longitudinally extending margin portions in mutual opposition, said single piece of planar sheet metal being bent into a tubular shape wherein said longitudinally extending margin portions lie in side-by-side relation to form a single tubular sleeve having at least two tubular sleeve parts, said tubular sleeve parts having tubular wall portions held in end-to-end coaxial alignment, and a longitudinal slot in said tubular sleeve parts, said at least two tubular sleeve parts having wall edge portions adjacent each other, coupling means on said adjacent wall edge portions of said tubular sleeve parts holding said tubular sleeve parts undetachably in contact with each other in at least approximately flush coaxial alignment, a clamping bolt surrounded by the said at least two sleeve parts, said at least two tubular sleeve parts and said clamping bolt insertable into said interior bore of said tubular pipe adjacent said open end of said tubular pipe, an end support portion on at least one of the two sleeve parts adjacent said open end of said tubular pipe and being pressable against the surface of the adjoining structural part, an opposite end portion on the other sleeve part of said at least two sleeve parts, a first anchorage part at one end of the clamping bolt in contact with and for transmitting an axial force to said opposite end portion on the other sleeve part, and then through the at least two sleeve parts and said end support portion to said surface of said adjoining structural part, a second anchorage part at the other end of the clamping bolt fixable into the adjoining structural part for maintaining a traction to the sleeve parts for axially moving said sleeve parts toward each other, at least two cooperating inclined edges respectively on the adjacent wall edge portions on said at least two tubular sleeve parts, said at least two sleeve parts slidable on said inclined edges relative to each other to be axially moved toward each other and expanded radially by a wedge effect upon fixing said second anchorage part of said clamping bolt into the adjoining structural part to transmit axial force to said at least two sleeve parts, whereby the wall portions of the at least two sleeve parts are expanded radially against the interior bore of the tubular pipe.

2. Connecting means according to claim 1, in which said inclined edges of the sleeve parts are inclined kerfs passing through approximately the whole thickness of the sleeve parts forming said coupling means, said coupling means including at least one intentional breaking point connecting the sleeve parts together, and said at least one intentional breaking point being breakable by transmitting of axial force from said clamping bolt to the sleeve parts.

3. Connecting means according to claim 2, including at least one serration at one margin portion and at least one recess at the opposed margin portion, said serration and said recess formed and positioned to be pressed into one another to retain the sheet metal of said tubular sleeve parts on both sides of the longitudinal slot together.

4. Connecting means according to claim 1, in which said at least two cooperating inclined edges of said at least two sleeve parts are of a first curvature which allow the sleeve parts to move toward each other, and said coupling means including second cooperating edges on said at least two sleeve parts having a second curvature forming stop surfaces for stopping the movement of the said at least two sleeves parts in the opposite direction axially away from each other.

5. Connecting means according to claim 1, in which the said at least two tubular sleeve parts form a cylindrical configuration so that they can be inserted into the interior bore of the pipe.

6. Connecting means according to claim 1, including at least four cooperating inclined edges on said at least two sleeve parts, a wedge-shaped extension on one of said two sleeve parts, two inclined edges of said four inclined edges formed on said wedge-shaped extension, the other two inclined edges of said four inclined edges forming a V-shaped cutout in the other of said two sleeve parts, said wedge-shaped extension of said one sleeve part engaging into said V-shaped cutout of said other sleeve part, and said V-shaped cutout effectively extends substantially the entire longitudinal length of said other sleeve part whereby axial movement of said wedge-shaped extension of one sleeve part into the V-shaped cutout of the other sleeve part expands the V-shaped cutout of the other sleeve part.

7. Connecting means according to claim 6, in which each of said at least two sleeve parts includes a said wedge-shaped extension situated approximately diametrically opposed, and the wedge-shaped extension of each sleeve part engaging in the V-shaped cutout of the adjacent sleeve part for axial movement of the sleeve parts toward each other and preventing tilting thereof.

8. Connecting means according to claim 6, in which said wedge-shaped extension including two adjacent extension parts from said margin portions in the planar sheet metal piece are separated by the longitudinal slot passing through at least one of the wedge-shaped extensions said adjacent extension parts being pressable against each other under the wedge effect by the axial force of the clamping bolt.

9. Connecting means according to claim 36, and said first anchorage part including a clamping recess on the clamping bolt, said opposite end portion on said other sleeve part of said at least two sleeve parts undetachably connected in said clamping recess to connect said other sleeve part with the clamping bolt.

10. Connecting means according to claim 30, including a rotative coupling between said opposite end portion on said other sleeve part of said at least two sleeve parts and said clamping bolt, undetachably connecting said clamping bolt with the said other sleeve part.

* * * * *